US009933282B2

(12) United States Patent
Tekin

(10) Patent No.: US 9,933,282 B2
(45) Date of Patent: Apr. 3, 2018

(54) SENSING DEVICE FOR A DIGITAL LINEAR POSITION SENSOR

(71) Applicant: Caterpillar Global Mining Europe GmbH, Lünen (DE)

(72) Inventor: Muhammet Tekin, Dortmund (DE)

(73) Assignee: Caterpillar Global Mining Europe GmbH, Lünen (DE)

( * ) Notice: Subject to any disclaimer, the term of this patent is extended or adjusted under 35 U.S.C. 154(b) by 0 days.

(21) Appl. No.: 15/318,904

(22) PCT Filed: Jun. 17, 2015

(86) PCT No.: PCT/EP2015/001225
§ 371 (c)(1),
(2) Date: Dec. 14, 2016

(87) PCT Pub. No.: WO2015/192965
PCT Pub. Date: Dec. 23, 2015

(65) Prior Publication Data
US 2017/0138764 A1 May 18, 2017

(30) Foreign Application Priority Data
Jun. 18, 2014 (EP) .................................... 14173050

(51) Int. Cl.
*G01D 5/14* (2006.01)
(52) U.S. Cl.
CPC .................................... *G01D 5/145* (2013.01)
(58) Field of Classification Search
CPC .... G01R 31/343; G06F 19/3481; F02N 11/04
See application file for complete search history.

(56) References Cited

U.S. PATENT DOCUMENTS 4,793,241 A    12/1988   Mano et al.
4,909,560 A *   3/1990   Ginn ........................ B60N 2/14
                                                     248/429

(Continued)

FOREIGN PATENT DOCUMENTS

DE    102011054231    4/2013
DE    102011121247    6/2013

(Continued)

OTHER PUBLICATIONS

International Search Report dated Sep. 15, 2015, issued in PCT/EP2015/001225 (2 pages).

(Continued)

*Primary Examiner* — Jermele M Hollington
*Assistant Examiner* — Alvaro Fortich

(57) ABSTRACT

A sensing device for a digital linear position sensor is disclosed. The sensing device may have a mounting device including a mounting surface. The sensing device may also have a plurality of resistors mounted on the mounting surface. The plurality of resistors may be electrically connected between a first voltage node (Uin) and a second voltage node (GND). Further, the sensing device may have a plurality of Hall switches mounted on the mounting surface at predetermined intervals in a longitudinal direction of the mounting device. Each of the plurality of Hall switches may be configured to adjust a total resistance of the plurality of resistors between the first voltage node (Uin) and the second voltage node (GND) upon actuation by an applied magnetic field.

20 Claims, 15 Drawing Sheets

(56) References Cited

U.S. PATENT DOCUMENTS

| | | | |
|---|---|---|---|
| 5,471,736 A | 12/1995 | Griebeler | |
| 6,351,117 B1 * | 2/2002 | Ehling | G01B 7/003 |
| | | | 324/207.12 |
| 6,922,158 B2 | 7/2005 | Ymker | |
| 7,650,828 B2 | 1/2010 | Rau et al. | |
| 8,058,867 B2 | 11/2011 | Lenz et al. | |
| 8,106,650 B2 | 1/2012 | Arns et al. | |
| 2009/0028371 A1 * | 1/2009 | Bailey | H04R 9/025 |
| | | | 381/386 |
| 2009/0278641 A1 | 11/2009 | Hedayat | |
| 2013/0076346 A1 | 3/2013 | Subrt | |

FOREIGN PATENT DOCUMENTS

| | | |
|---|---|---|
| WO | WO 93/22623 | 11/1993 |
| WO | WO 2009/078048 | 6/2009 |

OTHER PUBLICATIONS

European Search Report dated Dec. 4, 2014, issued in EP Application No. 14173050 (2 pages).

* cited by examiner

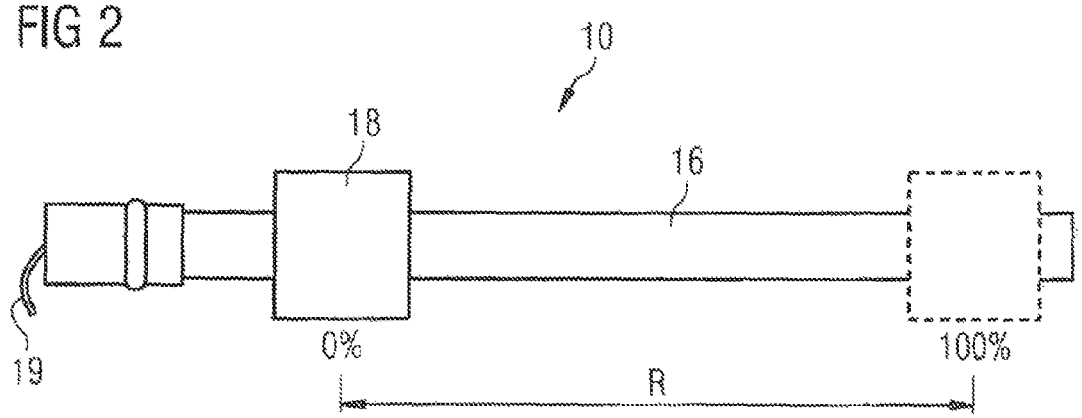
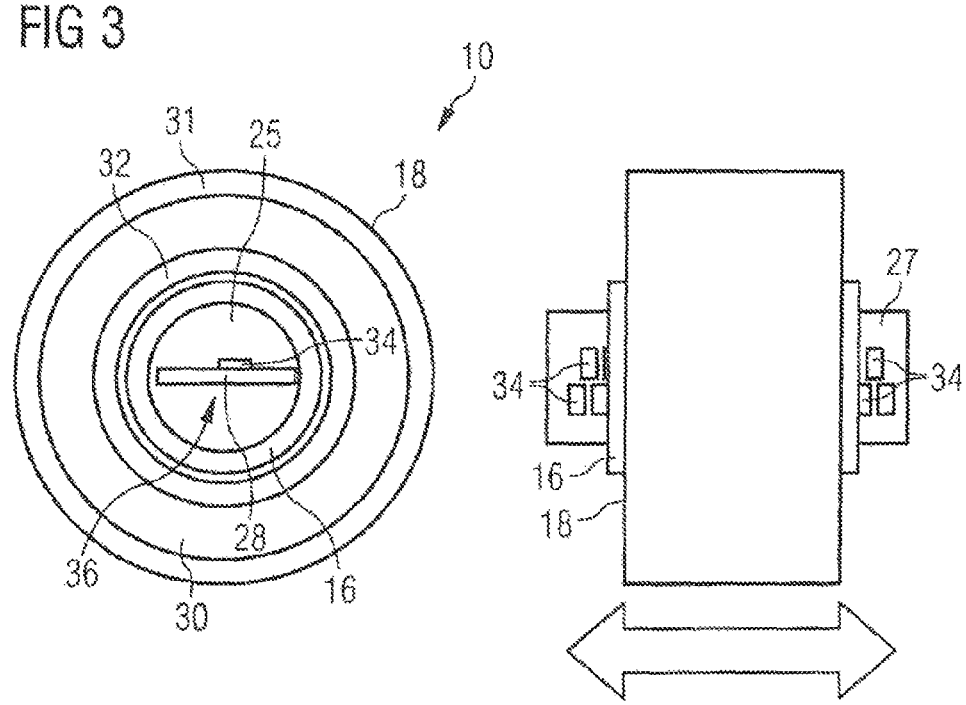

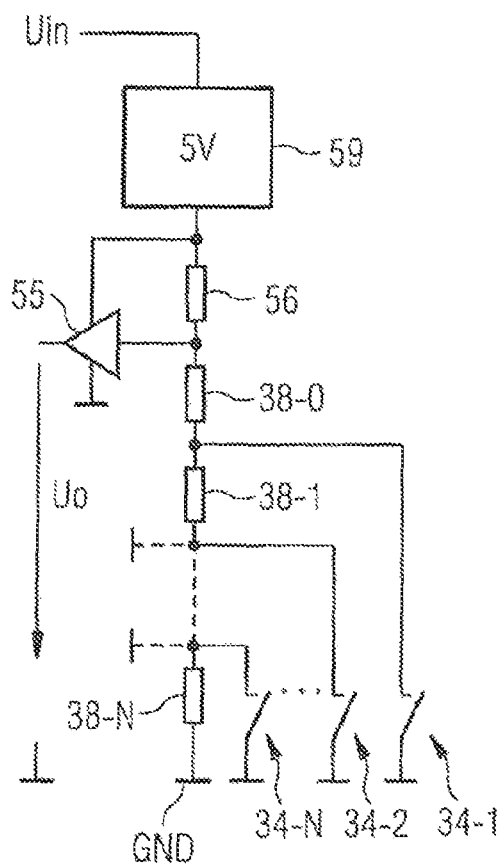
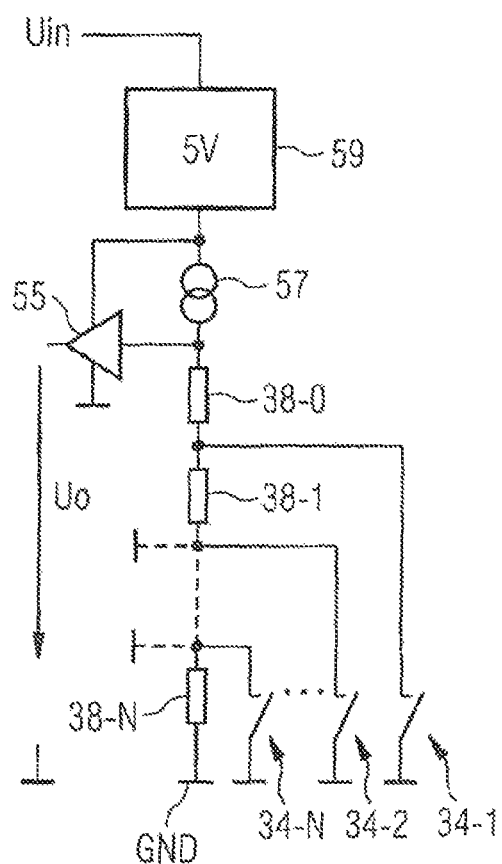

FIG 8A
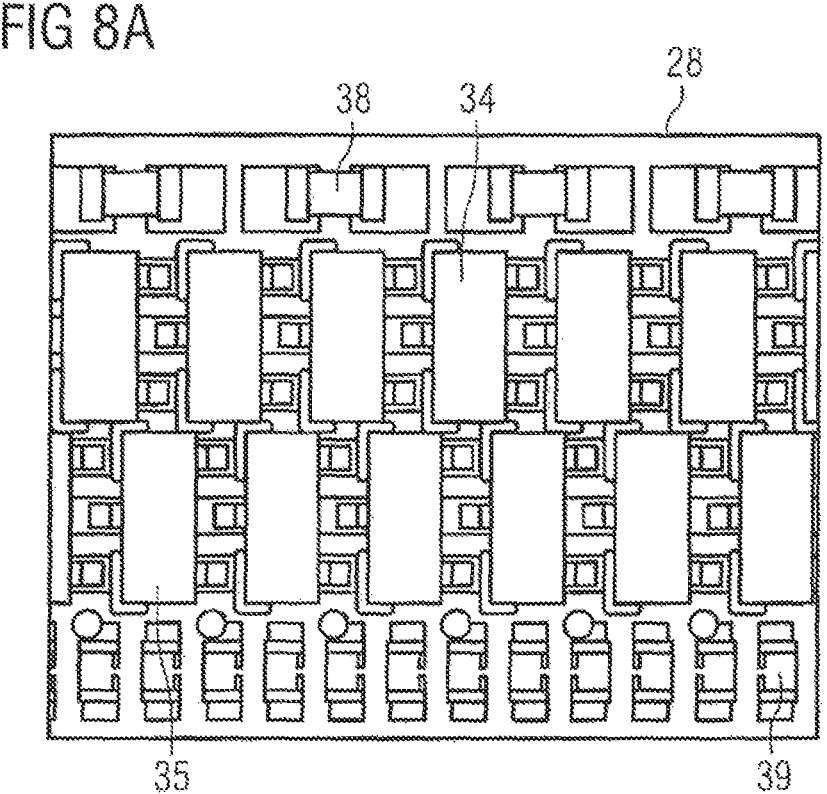
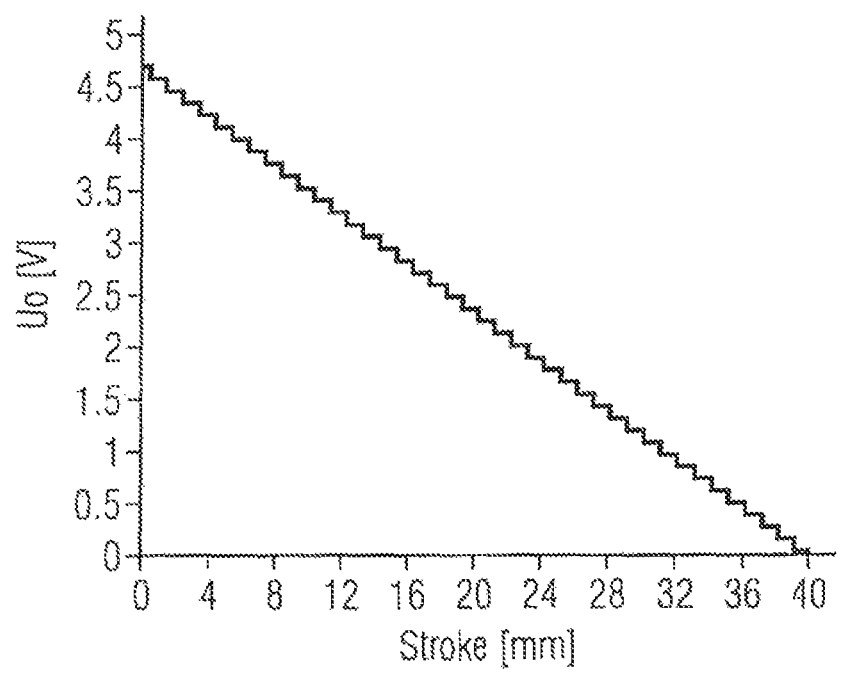

FIG 8B
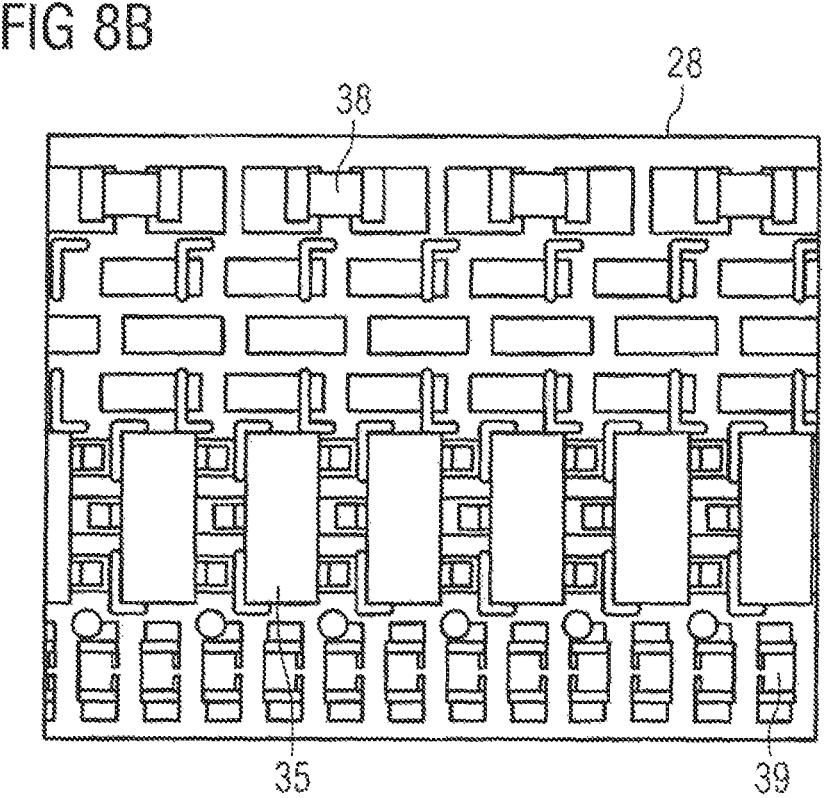
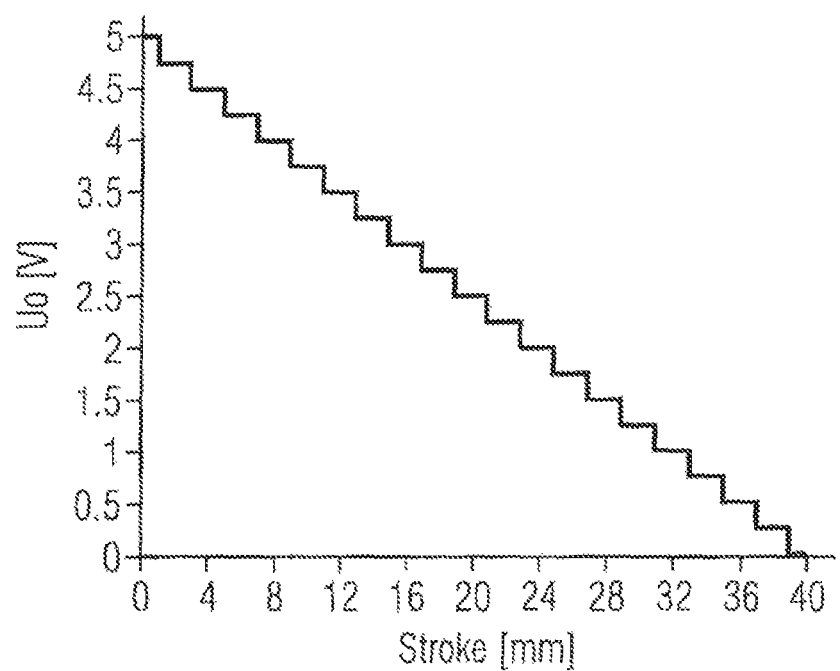

FIG 8C
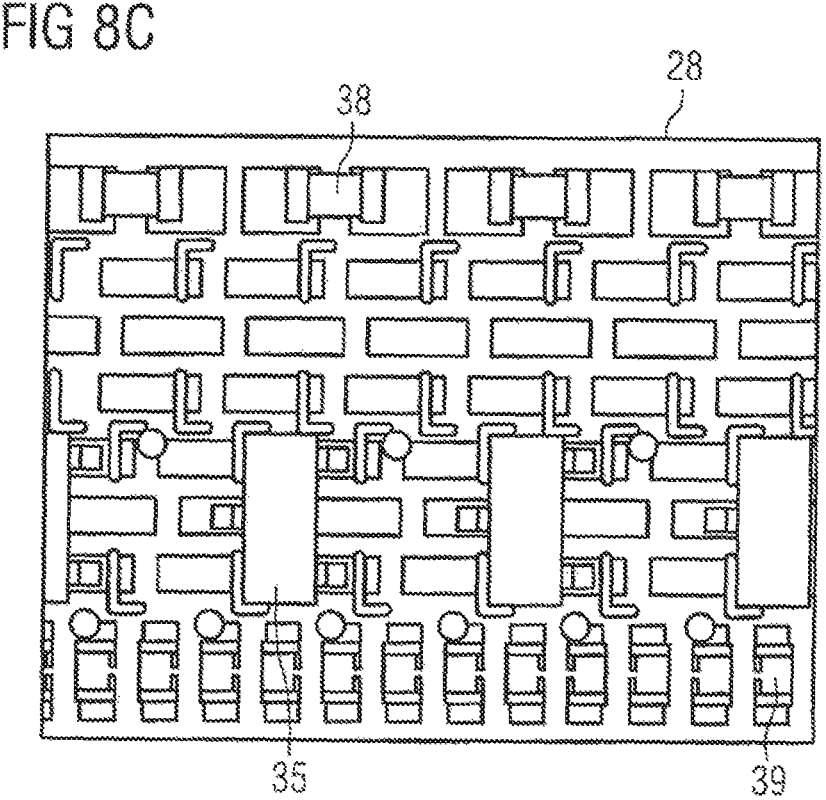
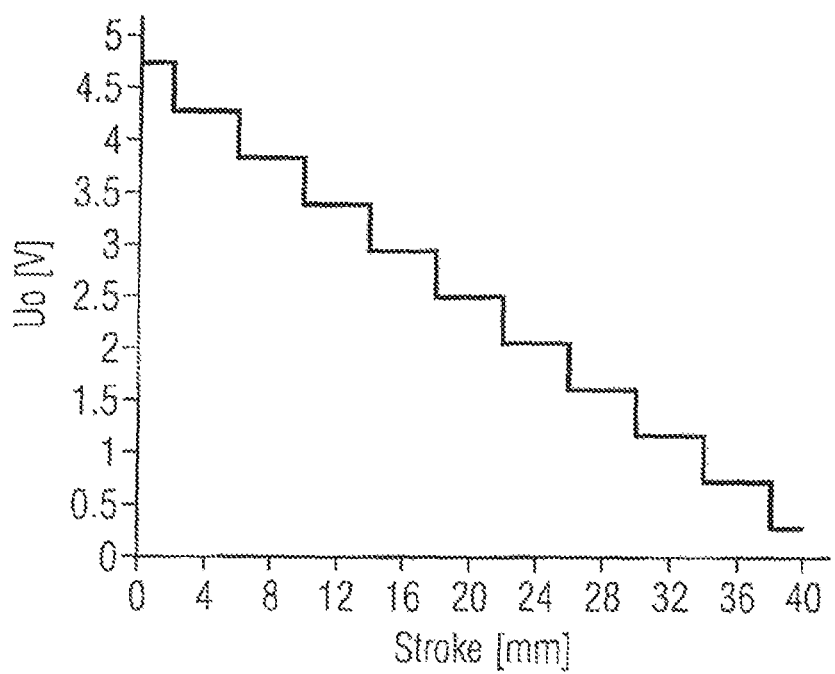

FIG 8D
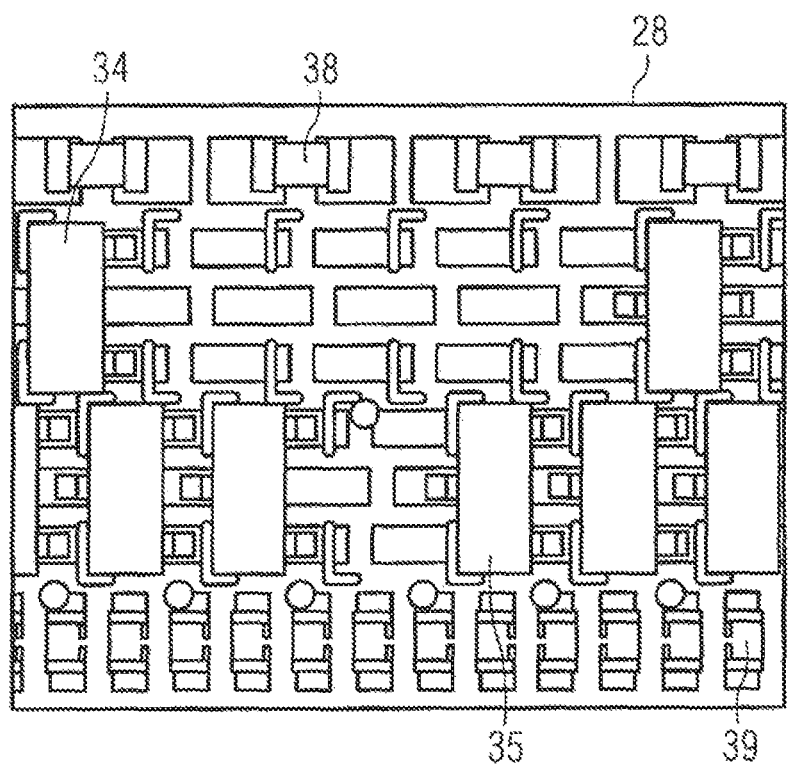
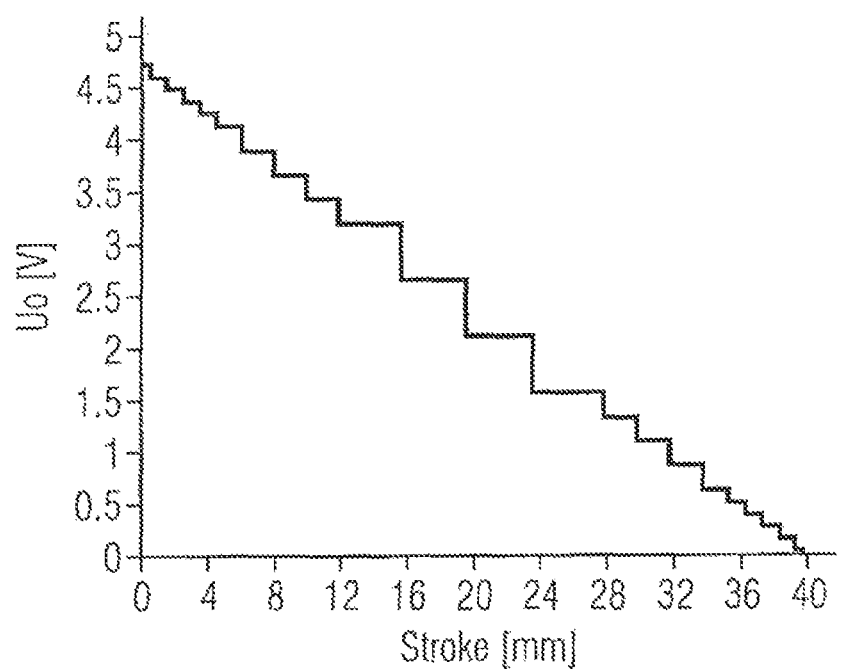

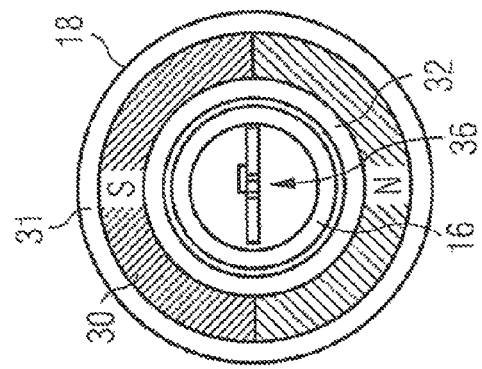
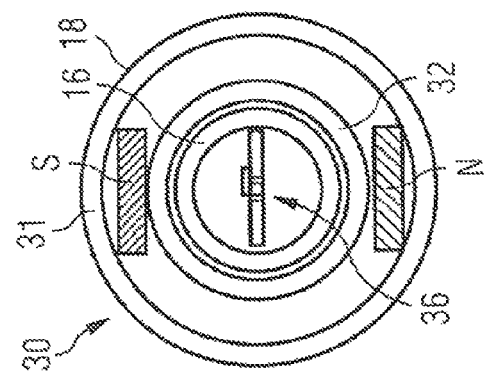
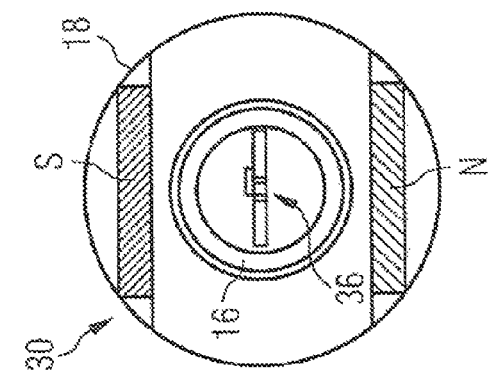
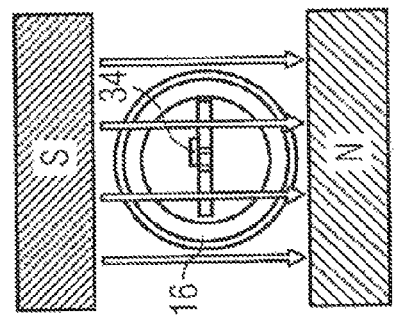

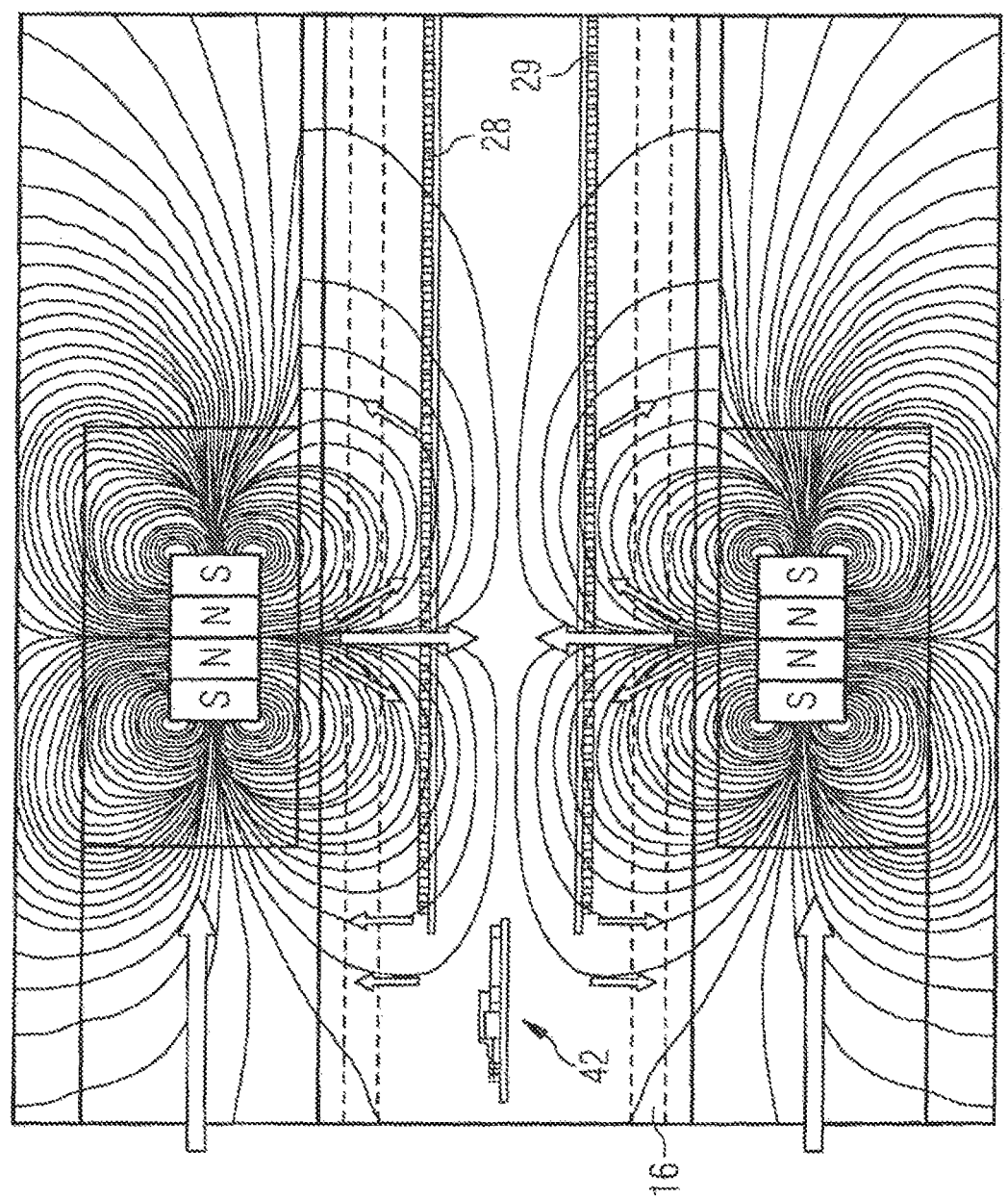
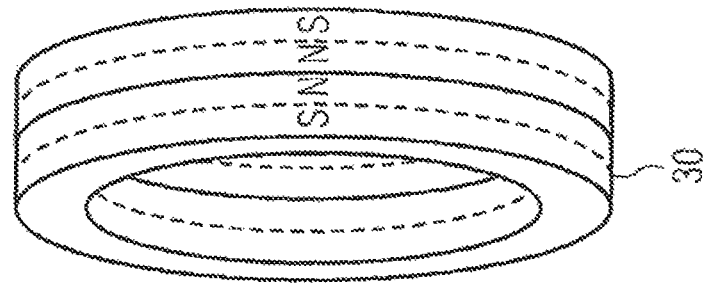
FIG 10A

SENSING DEVICE FOR A DIGITAL LINEAR POSITION SENSOR

CLAIM FOR PRIORITY

This application is a U.S. National Phase entry under 35 U.S.C. § 371 from PCT International Application No. PCT/EP2015/001225, filed Jun. 17, 2015, which claims benefit of priority of European Patent Application No. 14173050.7, filed Jun. 18, 2014, all of which are incorporated herein by reference.

TECHNICAL FIELD

The present disclosure generally relates to linear position sensors, for example, linear position sensors for hydraulic cylinders, in particular, a sensing device for such linear position sensors using Hall switches.

BACKGROUND

In underground mining, hydraulic cylinders are frequently used as, for example, pit props or moving cylinders in self-advancing supports.

In such hydraulic cylinders, it is important to detect the stroke of a piston of a hydraulic cylinder to determine the state of, for example, a self-advancing support. The stroke of the piston is generally detected using a contactless position sensor. DE 10 2011 121 247 A1 discloses a measuring rod including a plurality of Hall sensors. Each Hall sensor outputs a continuous voltage signal that depends on the intensity of an applied magnetic field. Based on the measured intensity, the distance of a Hall sensor to a magnet is determined. Using a measuring rod including Hall sensors may require calibration of each sensor and may increase the total cost of the position sensor. In addition, it may be difficult to replace the Hall sensors.

The disclosed systems and methods are directed at least in part to improving known systems.

SUMMARY OF THE DISCLOSURE

In one aspect, the present disclosure relates to a sensing device for a digital linear position sensor. The sensing device comprises a mounting device including a mounting surface, and a plurality of resistors mounted on the mounting surface. The plurality of resistors are electrically connected between a first voltage node and a second voltage node. A plurality of Hall switches are mounted on the mounting surface at predetermined intervals in a longitudinal direction of the mounting device. Each of the plurality of Hall switches is configured to adjust a total resistance of the plurality of resistors between the first voltage node and the second voltage node upon actuation by an applied magnetic field.

In another aspect, the present disclosure relates to a digital linear position sensor for a hydraulic cylinder. The digital linear position sensor comprises a rod configured to be fixedly mounted to the hydraulic cylinder. The rod has an internal space formed therein. A sensing device is disposed in the internal space and attached to the rod. The sensing device comprises a mounting device including a mounting surface, and a plurality of resistors mounted on the mounting surface. The plurality of resistors are electrically connected between a first voltage node and a second voltage node. A plurality of Hall switches are mounted on the mounting surface at predetermined intervals in a longitudinal direction of the mounting device. Each of the plurality of Hall switches is configured to adjust a total resistance of the plurality of resistors between the first voltage node and the second voltage node upon actuation by an applied magnetic field.

Other features and aspects of the present disclosure will be apparent from the following description and the accompanying drawings.

BRIEF DESCRIPTION OF THE DRAWINGS

FIG. 2 shows a schematic illustration of a digital linear position sensor in accordance with the present disclosure;

FIG. 3 shows two sectional views of the digital linear position sensor of FIG. 2;

FIGS. 5A and 5B respectively show schematic circuit diagrams for a sensing device in accordance with the present disclosure;

FIGS. 8A to 8D respectively show different configurations of a sensing device including Hall switches in accordance with the present disclosure;

FIGS. 9A to 9D respectively show different configurations of a magnet device for use with a sensing device in accordance with the present disclosure;

FIG. 10A shows a schematic illustration of a digital linear position sensor in accordance with the present disclosure;

DETAILED DESCRIPTION

The following is a detailed description of exemplary embodiments of the present disclosure. The exemplary embodiments described herein are intended to teach the principles of the present disclosure, enabling those of ordinary skill in the art to implement and use the present disclosure in many different environments and for many different applications. Therefore, the exemplary embodiments are not intended to be, and should not be considered as a limiting description of the scope of protection. Rather, the scope of protection shall be defined by the appended claims.

The present disclosure may be based in part on the realization that it may be desirable to reduce the material and manufacturing costs of linear position sensors for hydraulic cylinders by using cost-efficient parts known from the field of surface-mounted devices (SMDs) in combination with printed circuit boards (PCBs). In particular, it may be advantageous to use Hall switches mounted on a PCB to achieve this goal.

In addition, the present disclosure may be based in part on the realization that the use of Hall switches mounted on a PCB allows for an increase in the resolution and the reliability of the position sensor. The small dimension of Hall switches allows for mounting the same physically close to each other on the PCB. Further, arranging the Hall switches in several rows that are offset with respect to each other may further increase the resolution. An even further increase in the resolution can be obtained by using two PCBs on which Hall switches are mounted and which are offset with respect to each other. The reliability can be increased by using the Hall switches that do not include mechanical switches, and additionally by creating redundant measuring signals by using two PCBs in a single position sensor. The two PCBs may share the same control unit and power supply.

Moreover, the present disclosure may be based in part on the realization that the use of PCBs having Hall switches may allow for adapting the position sensor to different lengths to be measured by combining a plurality of units including the Hall switches in a cascading manner.

Figure 1:
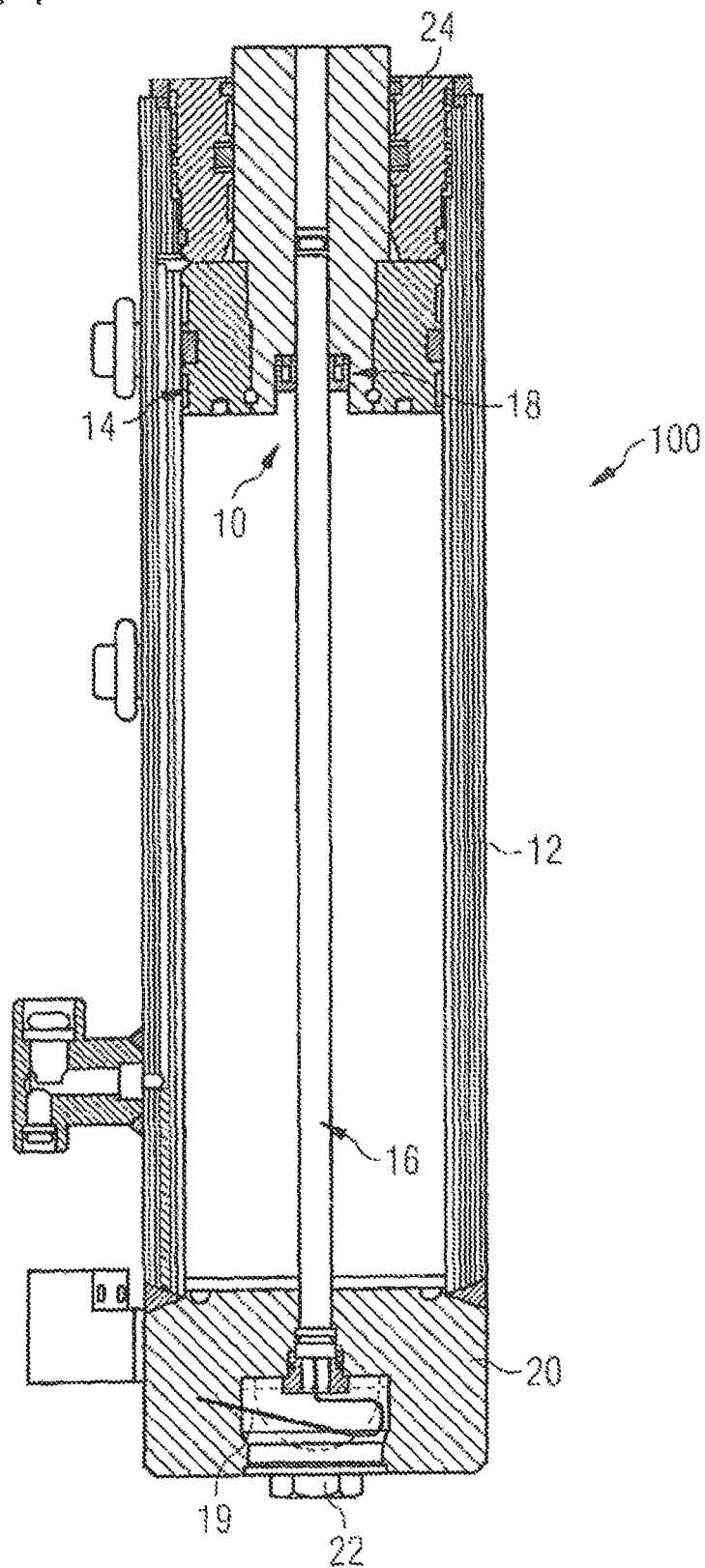
FIG. 1 shows a cross-sectional view of an exemplary hydraulic cylinder including a digital linear position sensor in accordance with the present disclosure.

Referring now to the figures, FIG. 1 shows a hydraulic cylinder 100 including a digital linear position sensor 10 in accordance with the present disclosure.

Hydraulic cylinder 100 includes an outer cylindrical tube 12, a piston 14 slidably arranged in outer cylindrical tube 12, a bottom 20 welded to outer cylindrical tube 12, and a sleeve holder 24 mounted to the end of outer cylindrical tube 12 opposite to bottom 20.

Position sensor 10 comprises a rod 16 fixedly mounted to bottom 20 of hydraulic cylinder 100. Rod 16 may be attached to bottom 20 via an opening formed in bottom 20, and may also be removed from the same via said opening. A lid 22 may be attached to bottom 20 to close the opening during operation of hydraulic cylinder 100. A signal line 19 is attached to rod 16 and connects the same to the outside of hydraulic cylinder 100.

Piston 14 is disposed around rod 16 such that it may slide with respect to rod 16 to expand and retract. A magnet device 18 is attached to piston 14 such that it is disposed around rod 16 and movable along the same with a movement of piston 14 in hydraulic cylinder 100. In this manner, a sensing device 36 (see, for example, FIG. 3) disposed in an internal space of rod 16 may detect a position of magnet device 18 during movement of piston 14. Accordingly, a stroke of piston 14 can be determined from a measuring result obtained by sensing device 36 and output via signal line 19.

FIG. 2 schematically shows linear position sensor 10. As shown in FIG. 2, position sensor 10 may be configured such that magnet device 18 is movable along rod 16 over a range R. It will be readily appreciated that position sensor 10 may output a measuring result indicating a position of magnet device 18 in range R, or may output an output signal from which the position of magnet device 18 in range R can be determined via signal line 19. It will also be appreciated that, depending on the configuration of hydraulic cylinder 100 and position sensor 10, an appropriate calibration may have to be performed in order to determined the stroke of piston 14 from the measuring result obtained by position sensor 10.

FIG. 3 shows two cross-sections of position sensor 10, with the left side of FIG. 3 showing a cross-section perpendicular to a longitudinal direction of rod 16, and the right side showing a partial sectional view in a plane parallel to the longitudinal direction.

As shown in FIG. 3, a sensing device 36 is disposed in an internal space 25 formed inside rod 16. In the exemplary embodiment shown in FIG. 3, rod 16 is formed as a hollow cylindrical tube. As also shown in FIG. 3, rod 16 is surrounded by magnet device 18, which, in the exemplary embodiment, is formed as a hollow cylindrical body. Magnet device 18 includes an outer shell 31, an inner shell 32, and a magnet 30 disposed between outer shell 31 and inner shell 32. In the example shown in FIG. 3, outer shell 31 and inner shell 32 are formed as cylindrical tubes. In a similar manner, exemplary magnet 30 is formed as a ring magnet. As will be discussed in more detail below, magnet 30 may have a different configuration in other exemplary embodiments.

As shown in FIG. 3, sensing device 36 includes a mounting device 28 that has a mounting surface 27 on which a plurality of Hall switches 34 are mounted.

As used herein, the term "Hall switch" is used for a digital switch that is configured to be switched between two states, "ON" and "OFF", depending on the magnitude of an applied magnetic field. Hall switches are generally known, and a basic Hall switch may consist of a Hall effect plate, an amplifier, a trigger and an electronic switch such as, for example, a field effect transistor (FET). The Hall effect plate produces an output that depends on the magnitude of the applied magnetic field. This output may be amplified, and the trigger may turn on when the amplified output reaches a certain level, which in turn will switch the FET to "ON". In this manner, when the FET is "ON", a device connected to the Hall switch may be connected to, for example, ground. When the Hall switch is "OFF", the path to ground is interrupted. It will be readily appreciated that a Hall switch for use in the embodiments in accordance with the present disclosure may have a different configuration, if appropriate.

As shown in FIG. 3, magnet device 18 is configured to move along rod 16, and therefore also moves along sensing device 36 including Hall switches 34. Hall switches 34 are arranged at predetermined intervals in a longitudinal direction of mounting device 28. In the example shown in FIG. 3, two rows of Hall switches are arranged offset with respect to each other in the longitudinal direction. However, a configuration with a single row of Hall switches, or with more than two rows of Hall switches offset with respect to each other may also be used. Depending on the position of magnet device 18 in the longitudinal direction, different Hall switches 34 will be turned on, with the remaining Hall switches being turned off.

Figure 4:
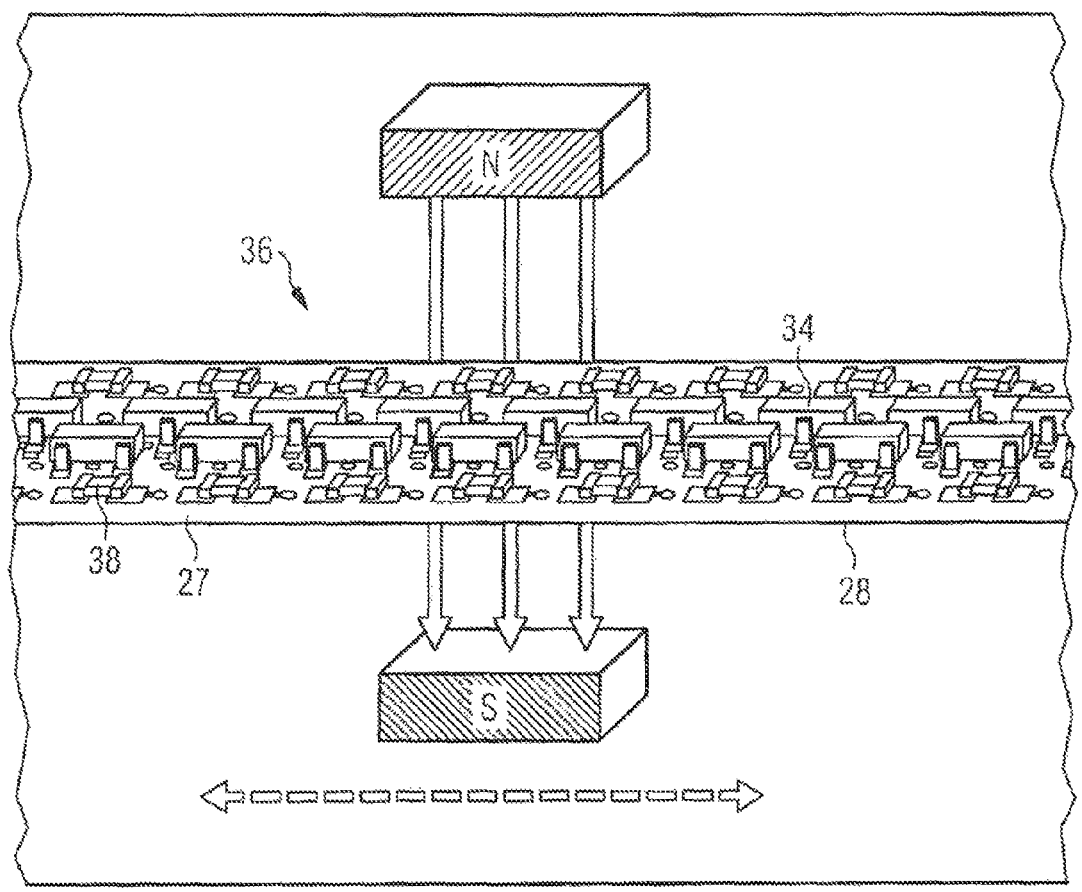
FIG. 4 shows a schematic perspective view of a part of a sensing device in accordance with the present disclosure.

As shown in FIG. 4, sensing device 36 also includes a plurality of resistors 38 mounted on mounting surface 27 of mounting device 28. In accordance with some embodiments, mounting device 28 is configured as a surface-mount device, and resistors 38 and Hall switches 34 may be mounted on mounting device 28 using a surface-mount technique. In particular, mounting device 28 may be a printed circuit board (PCB). As will be described in more detail below, using an appropriate circuit configuration for resistors 38 and Hall switches 34 it is possible to produce an output signal that varies step-wise and in a linear manner as magnet device 18 moves along sensing device 36 to turn on different Hall switches 34.

As shown in FIG. 4, Hall switches 34 are generally mounted on mounting device 28 such that the associated Hall plate is arranged perpendicular to magnetic field lines generated by magnet device 18. However, as will be described in more detail below, different orientations are also possible, as long as a component of the magnetic field generated by magnet device 18 perpendicular to the Hall plate of each Hall switch 34 is large enough to turn the corresponding Hall switch on when magnet device 18 is at a position corresponding to said Hall switch 34.

Two exemplary circuit configurations for producing an output signal from which the position of magnet device 18 with respect to sensing device 36 can be determined are shown in FIGS. 5A and 5B.

As shown in FIG. 5A, a plurality of resistors 38-0 to 38-N is electrically connected in series between a first voltage node Uin and a second voltage node GND. For example, a voltage of 5V supplied by a voltage supply 59 may be applied at first voltage node Uin. In the example, second voltage node GND may be grounded. It should be readily appreciated, however, that any appropriate configuration with two different voltages between the two voltage nodes can be used.

A plurality of Hall switches 34-1, 34-2 to 34-N are connected to resistors 38-1 to 38-N, respectively. In particular, as shown in FIG. 5A, each Hall switch may be connected to a node formed between two adjacent resistors. Upon being actuated by a magnetic field applied by magnet device 18, a corresponding one or several of Hall switches 34-1, 34-2 to 34-N may be closed and may connect the corresponding node to second voltage node GND, in the example, connect the node to ground, thereby changing the total resistance of resistors 38-0 to 38-N between first voltage node Uin and second voltage node GND.

It will be readily appreciated from FIG. 5A that FIG. 5A corresponds to a voltage divider circuit, where a voltage drop Uo across resistors 38-0 to 38-N changes depending on which of Hall switches 34-1 to 34-N is closed. In particular, position sensor 10 may be configured such that, when piston 14 (see FIG. 1) is fully retracted, all of Hall switches 34-1 to 34-N are open, or only one or more of first Hall switches 34-1, 34-2, . . . are closed. Accordingly, voltage drop Uo across resistors 38-0 to 38-N will have a maximum value. Further, as piston 14 begins to expand, magnet device 18 will move with respect to rod 16, and therefore also with respect to sensing device 36 (see FIG. 3), and the first Hall switches 34-1, 34-2, . . . will again be opened, while subsequent Hall switches will be closed. Accordingly, the voltage drop Uo across resistors 38-0 to 38-N will linearly decrease in a step-wise manner. The voltage drop Uo may be detected via a voltage dividing resistor 56 and an amplifier 55, and may be output to a signal conditioning unit 42 (see FIG. 6). It is preferable that the resistance of resistor 56 is much larger than the resistance of resistors 38-0 and/or resistors 38-1 to 38-N. In some embodiments, resistor 38-0 may be omitted. Further, resistors 38-1 to 38-N (and, optionally, resistor 38-0) may be configured to have the same resistance. An example of the output Uo obtained by using one exemplary configuration of sensing device 36 is shown, for example, in FIG. 8A, which will be described in more detail below.

FIG. 5B shows a modification of the circuit of FIG. 5A where voltage dividing resistor 56 has been replaced by a constant current source 57. The circuit shown in FIG. 5B will function in substantially the same manner as the circuit shown in FIG. 5A, such that a detailed description will be omitted. Likewise, the output signal produced by the circuit shown in FIG. 5B will substantially be similar to the output produced by the circuit shown in FIG. 5A.

It should be appreciated that other circuit configurations resulting in an output signal from which the position of the Hall switches on which magnet device 18 acts can be obtained will be apparent to the skilled person. For example, it is also contemplated that the resistors 38-1 to 38-N may be connected in parallel, and/or that the Hall switches may be closed (ON) when no magnetic field is present, and may be opened (turned OFF) by the magnetic field. Different configurations may be used, as long as the actuation of the Hall switches disposed along mounting surface 27 results in a linear change in the total resistance of the resistors or another characteristic from which a position of magnet device 18 can be determined.

As previously mentioned, in some embodiments, sensing device 36 may be configured such that mounting device 28 is a surface-mount device such as a PCB, and resistors 38 and Hall switches 34 are mounted on mounting device 28 using a surface-mount technique. As it may be necessary in some applications to provide a position sensor 10 having a relatively great length, for example, more than 100 mm, in particular, between 500 mm and 5000 mm, between 500 mm and 1000 mm, or between 1000 mm and 3000 mm, preferably between 600 mm and 1600 mm, mounting device 28 may be configured to include a plurality of mounting units 28-0, 28-1, 28-2 and 28-3.

Figure 6:
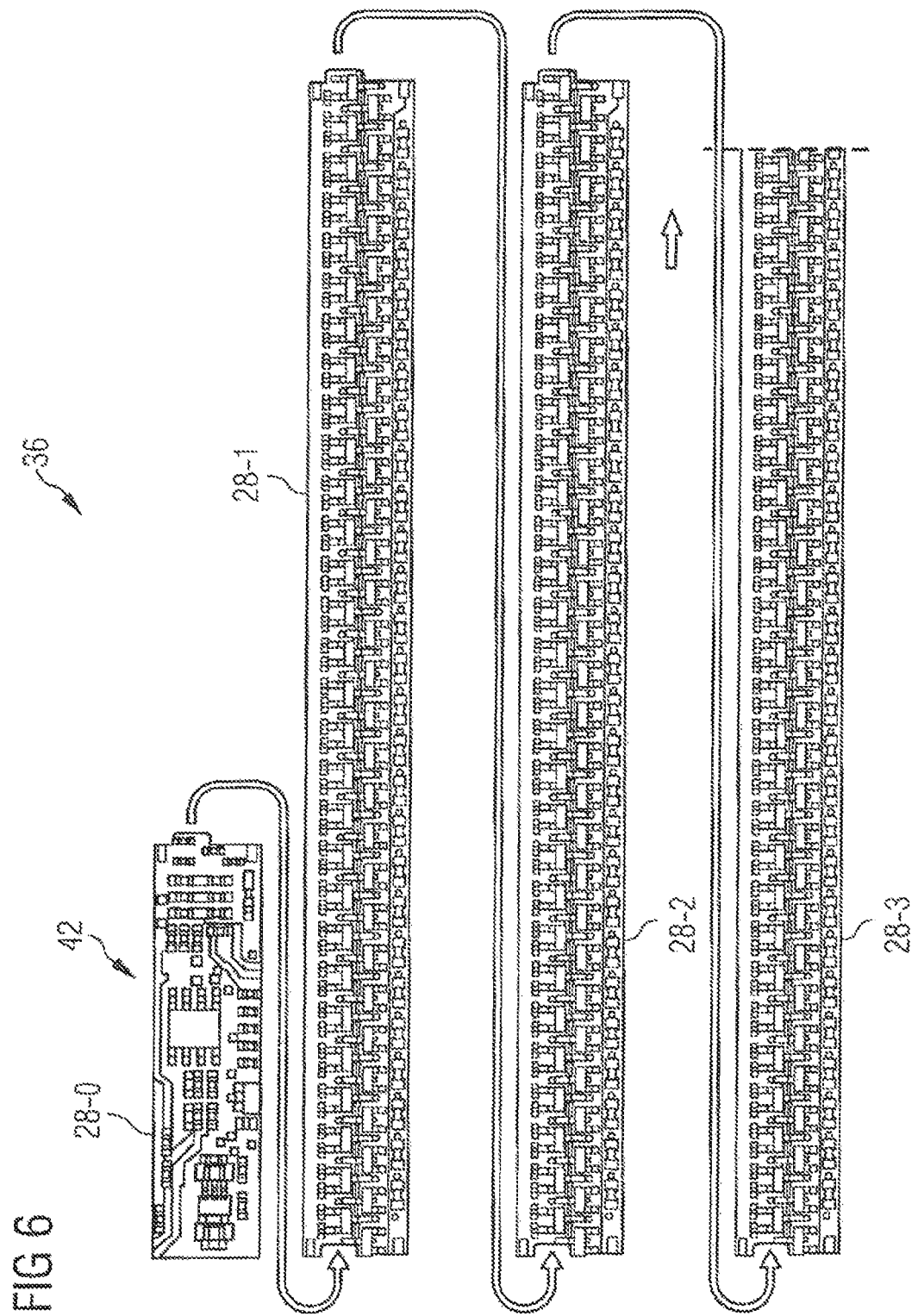
FIG. 6 shows an exemplary embodiment of a sensing device in accordance with the present disclosure.

FIG. 6 shows one example for a mounting device including such a plurality of mounting units. It will be readily appreciated that the number of mounting units may be different from the example shown in FIG. 6. Further, it will be appreciated, that two or more of the mounting units may have the same configuration, and that any appropriate number of mounting units may be combined to form mounting device 28. In addition, one mounting unit 28-0 may have a different configuration than the other mounting units 28-1, 28-2 and 28-3 and may include a control unit including, for example, signal conditioning unit 42 for receiving the output generated by the circuits shown in FIG. 5A and FIG. 5B and process said output to determine voltage drop Uo and, optionally, to determine which of the plurality of Hall switches has been closed by the influence of the magnetic field. It will be readily appreciated, however, that signal conditioning unit 42 may also be disposed separately from sensing device 36, for example, outside of rod 16 and hydraulic cylinder 100, if desired. Likewise, an evaluation unit for evaluating an output of signal conditioning unit 42 to determine the position of piston 14 may be formed separate from or as part of signal conditioning unit 42, and may also be disposed within rod 16 or outside of hydraulic cylinder 100.

As shown in the example of FIG. 6, each mounting unit 28-1, 28-2, 28-3 may have substantially the same configuration with a given length. Further, as also shown in FIG. 6, the last mounting unit 28-3 may be cut at a distal end of the same to obtain a sensing device 36 having a desired total length.

Figure 7A:
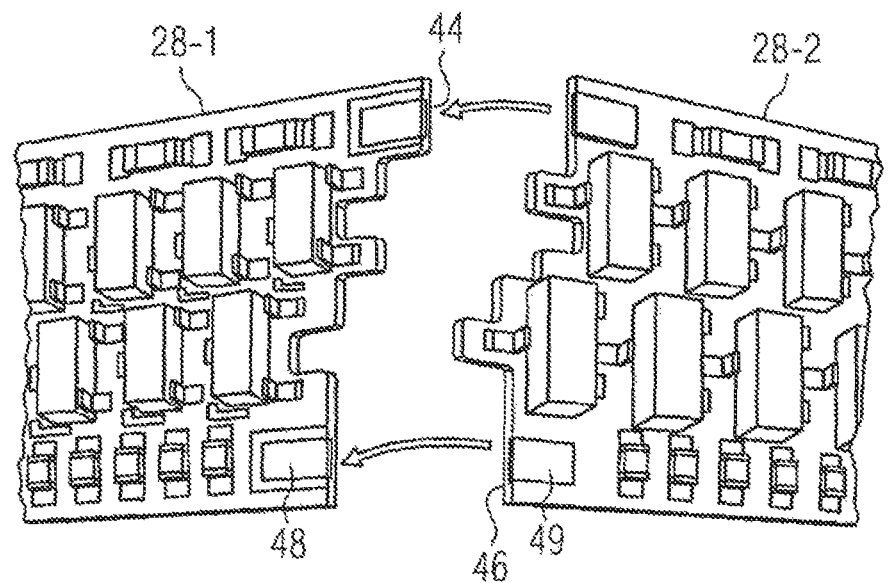
FIGS. 7A and 7B show an assembly of a sensing device including a plurality of mounting units in accordance with the present disclosure.
Figure 7B:
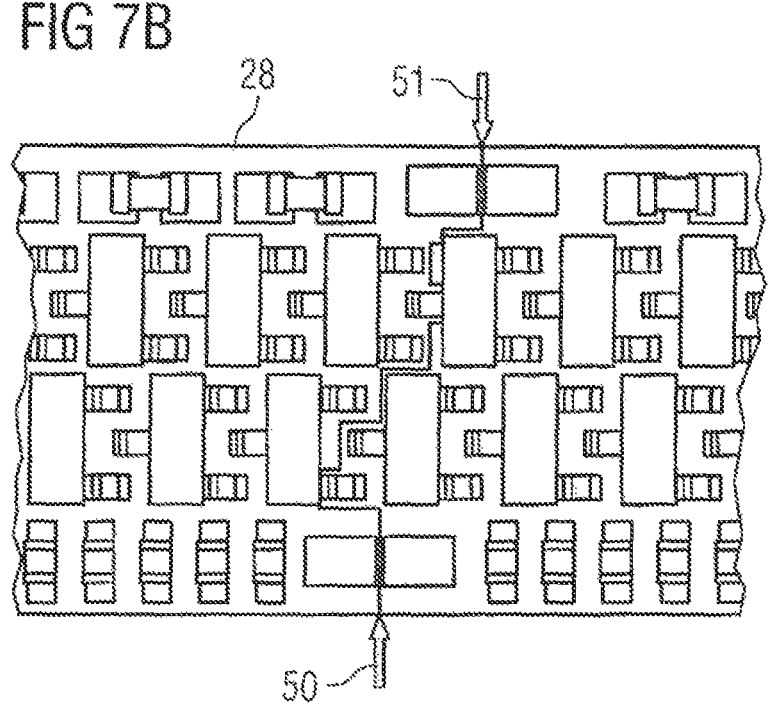

As shown in FIGS. 7A and 7B, each of mounting units 28-1, 28-2, 28-3 may have a first connecting portion 44 and a matching second connecting portion 46 formed at opposite ends of the same. Each of mounting units 28-1, 28-2, 28-3 is configured to be electrically connected to at least one other mounting unit having at least one of first connecting portion 44 and second connecting portion 46. For example, as will be readily appreciated from FIG. 6, mounting unit 28-0 including signal conditioning unit 42 may only include first connecting portion 44 and may be configured to be connected to second connecting portion 46 of mounting unit 28-1 having resistors 38 and Hall switches 34 mounted on the same. As shown in FIGS. 7A and 7B, each of connecting portions 44, 46 may include contact portions 48, 49, respectively, being configured to be electrically connected to each other by, for example, soldering or the like at junctions 50, 51, respectively. In this manner, a cascade of mounting units (PCBs) may easily be formed by soldering separate mounting units to each other in order to obtain a mounting device 28 having the desired length. In other embodiments, a mounting device having a desired length may be formed by using a flex strip technology. As previously mentioned, signal conditioning unit 42 may be directly connected to the plurality of Hall switches and the plurality of resistors, or may be formed separately and be connected via, for example, wires and/or signal line 19.

FIGS. 8A to 8D show different configurations of Hall switches 34 and 35 formed on mounting device 28. In particular, as shown in FIGS. 8A to 8D, two rows of Hall switches may be formed on mounting device 28, a first row of Hall switches 34 and a second row of Hall switches 35. This may be done to increase the resolution of sensing device 36 to a resolution that is higher than that which can be obtained using a single row of Hall switches 34. For example, Hall switches 34 may be configured such that they can only be arranged at intervals of around 2 mm due to their size and the space needed for forming the required connections on mounting device 28. If, however, second row of Hall switches 35 is formed such that it is offset with respect to first row of Hall switches 34 by less than the interval separating two adjacent Hall switches, the resolution can be increased. For example, second row of Hall switches 35 may be offset with respect to first row of Hall switches 34 by 1 mm, to achieve a resolution that also corresponds to steps of 1 mm. The resulting output signal is shown in the lower part of FIG. 8A. As can be seen from FIG. 8A, a substantially linear signal is obtained that can resolve changes in the stroke of piston 14 with a high resolution.

Alternatively, it is also possible to use the same mounting device 28 that allows for mounting the full two rows of Hall switches 34, 35, but to omit some of the Hall switches in order to save costs. In the example shown in FIG. 8B, one full row of Hall switches is omitted, leaving only a single row of Hall switches 35. As can be seen from the lower part of FIG. 8B, this results in that the resolution is also reduced by half. However, in applications where this resolution is sufficient, such a configuration can be used.

In other applications, where an even coarser resolution is sufficient, one full row of Hall switches and every other one of the remaining row of Hall switches 35 may be omitted. Accordingly, as shown in FIG. 8C, the resolution of the output signal will be reduced even more.

In other embodiments, it may be sufficient to have a high resolution close to the end positions of the movement measured by position sensor 10, and a coarse resolution may be acceptable in the center of the movement range. Accordingly, the configuration shown in FIG. 8D can be used, where the full number of Hall switches 34, 35 is provided adjacent to the ends of mounting device 28, and Hall switches 34, 35 are selectively omitted in the central region of mounting device 28 as appropriate. The resulting output signal is shown in the lower part of FIG. 8D. Of course, it is contemplated that different configurations of Hall switches may be used, depending on the application and the desired resolution.

It will be readily appreciated that there is a limit to the minimum resolution or the maximum space between two Hall switches, which depends at least in part on the dimension of magnet device 18. In particular, the magnetic field produced by magnet device 18 must be strong enough (have a spatial extension that is large enough) such that it is assured that at any point at least one Hall switch is actuated by magnet device 18 in order to be able to determine the position of magnet device 18 in the above-described manner.

FIGS. 9A to 9D show different configurations of magnet device 18 that may be used in a position sensor in accordance with the present disclosure.

As already mentioned, and generally shown in FIG. 9A, the magnetic field generated by magnet device 18 must be such that there is at least a magnetic field component that is perpendicular to Hall switches 34 and large enough to actuate the same. As shown in FIG. 9B, this can be achieved by using, for example, two chip magnets disposed on opposite sides of rod 16, which chip magnets may be disposed between outer shell 31 and inner shell 32 as shown in FIG. 9C. In other embodiments, an isotropic ring magnet having the configuration shown in FIG. 9D may be used to generate the required magnetic field that acts on sensing device 36, in particular, Hall switches 34 of sensing device 36.

In another embodiment, two counterpole mounted ring magnets may be used as magnet 30. The counterpole mounted magnets may produce an axial magnetic field as shown by the field lines in FIG. 10A. As will be readily appreciated, the resulting magnetic field requires that mounting device 28, i.e., the Hall switches mounted on the same, are offset from a central axis of rod 16 in order for a magnetic field component perpendicular to mounting device 28 to act on the Hall switches. As shown in the example of FIG. 10A, this allows for providing a second mounting device 29 having a second plurality of Hall switches mounted on the same to be disposed inside rod 16. In one embodiment, the two mounting devices 28, 29 may be advantageously connected to a single signal conditioning unit 42 and/or a single power supply by appropriate wires.

The configuration shown in FIG. 10A has several advantages. First of all, it is fully compatible with existing systems using a plurality of reed switches as a position sensor. In such position sensors including a plurality of read switches, generally a magnet similar to the one shown in FIG. 10A is used. Accordingly, the example shown in FIG. 10A allows replacing the sensor including the reed switches by the sensor according to the present disclosure having the Hall switches. This results in an increased resolution due to the smaller size of the Hall switches, and the provision of redundancies in order to increase the reliability.

Figure 10B:
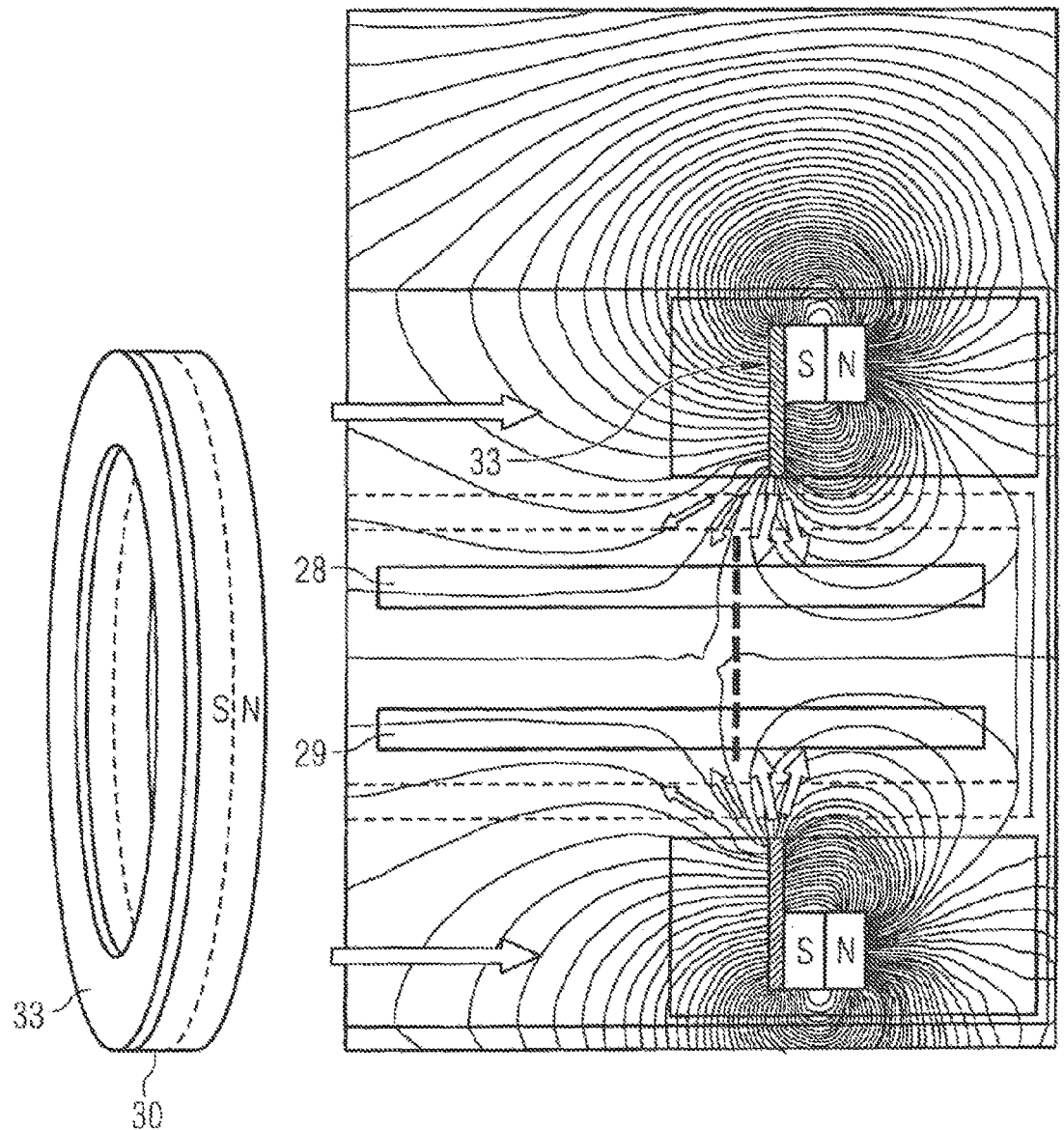
FIG. 10B shows a schematic illustration of another digital linear position sensor in accordance with the present disclosure.

FIG. 10B shows a modification of the example shown in FIG. 10A. In this modification, a magnetic shield device 33 is provided on one side surface of a single ring magnet producing an axial magnetic field. As shown in FIG. 10B, this results in an asymmetric magnetic field being generated. Accordingly, a stray magnetic field may be weaker on one side of magnet 30 in the measuring direction (to the left of the dashed line in FIG. 10B). Accordingly, it can be prevented that one of the Hall switches that may affect the position measurement is switched on by the stray magnetic field. On the opposite side (to the right of the dashed line in FIG. 10B), this will not affect the position measurement, as will be readily appreciated from the circuit diagrams shown in FIGS. 5A and 5B.

Figure 11A:
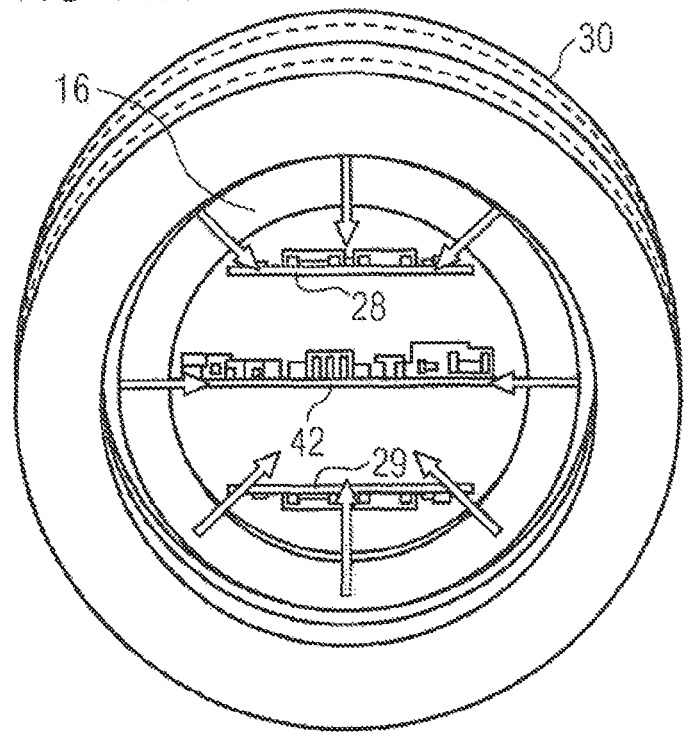
FIGS. 11A and 11B respectively show plan views of different configurations of the digital linear position sensor of FIG. 10A.
Figure 11B:
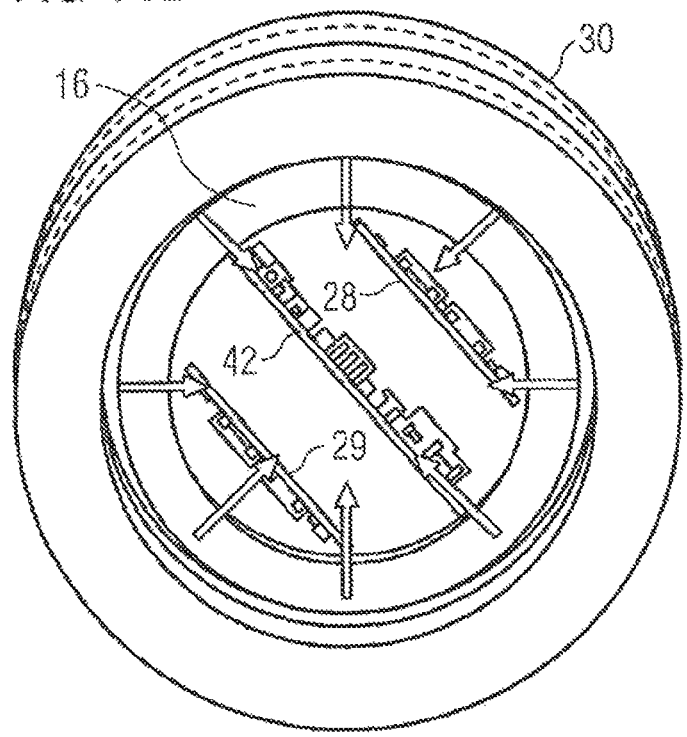

Further, as is shown in FIGS. 11A and 11B, due to the configuration of the magnetic field generated by the magnets shown in FIGS. 10A and 10B, the angular position at which sensing device 36, i.e., mounting devices 28, 29 and signal conditioning unit 42, is mounted in rod 16 can be an arbitrary position. Therefore, it is not necessary to make sure that sensing device 36 has a specific orientation with respect to magnet 30. This allows for an easy installation of sensing device 36 in rod 16.

Furthermore, using the configuration shown in FIGS. 10A, 10B and 11A, 11B allows for creating a redundancy with respect to the Hall switches and/or the signal conditioning circuit. It will be readily appreciated that, in case two independent mounting devices 28, 29 are used in combination with a single signal conditioning unit 42, signal conditioning unit 42 can still provide an output signal that allows for measuring the position when one of devices 28, 29 malfunctions and no longer produces a correct output signal. To further increase the reliability, separate signal conditioning units 42 could be provided for each of devices 28, 29.

Figure 12A:
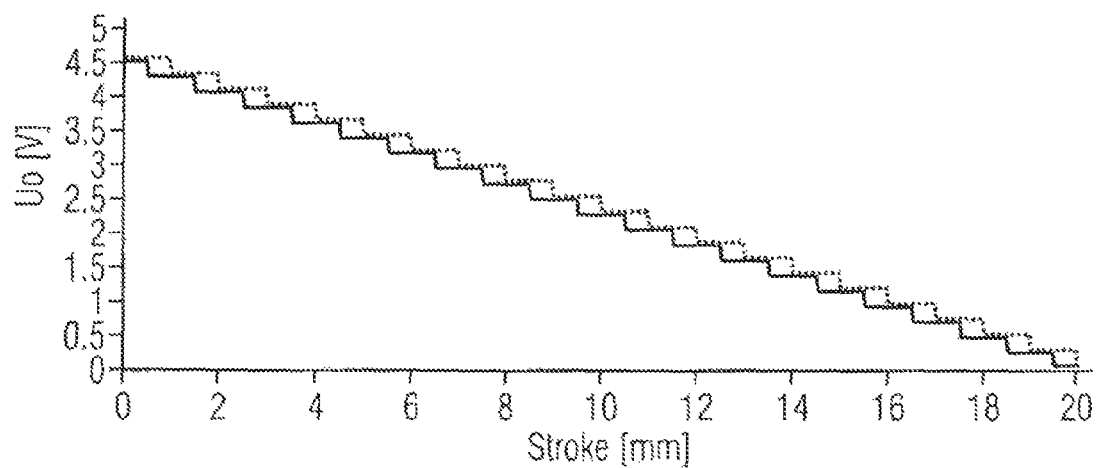
FIGS. 12A and 12B show graphical representations of an output signal of a sensing device in accordance with the present disclosure.
Figure 12B:
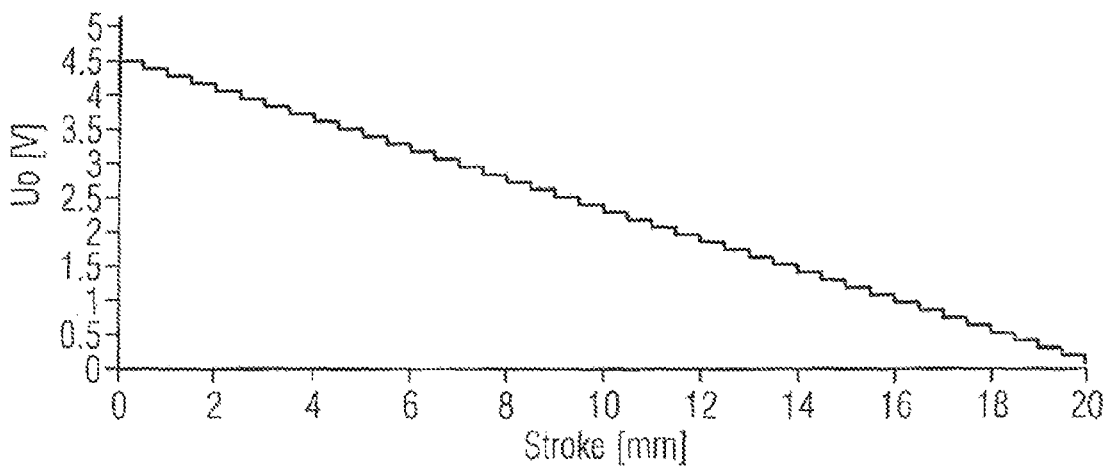

In addition, it is also possible to increase the resolution of the position measurement even further. In case mounting devices 28, 29 shown, for example, in FIGS. 10A and 10B are offset in the longitudinal direction by a distance that is less than the resolution provided by each separate device, for example, half the resolution distance, signal conditioning unit 42 can evaluate the two signals received from mounting devices 28, 29 to combine the same and achieve a resulting output signal having twice the resolution. This is shown in FIGS. 12A and 12B, where FIG. 12A shows the two output signals obtained from both devices, and FIG. 12B shows the combined (averaged) output signal having the increased resolution.

It should be noted that, while in the above-described embodiments Hall switches 34, 35 and resistors 38, 39 were mounted on one side of mounting devices 28, 29, in other embodiments, Hall switches 34, 35 and/or resistors 38, 39 may be mounted on both sides (opposing sides) of mounting devices 28, 29, if desired.

INDUSTRIAL APPLICABILITY

The industrial applicability of the systems and methods disclosed herein will be readily appreciated from the foregoing discussion. One exemplary application is the use of the disclosed sensing device for a digital linear position sensor used, for example, as a position sensor in a hydraulic cylinder, in particular, a hydraulic cylinder associated with an industry such as underground mining or the like. However, it will be readily appreciated that the disclosed sensing device and the disclosed digital linear position sensor can also be used in other industries, for measuring the stroke of a hydraulic cylinder, or for measuring a linear movement of other moveable parts.

It will be appreciated that the foregoing description provides examples of the disclosed systems and methods. However, it is contemplated that other implementations of the disclosure may differ in detail from the foregoing examples. All references to the disclosure or examples thereof are intended to reference the particular example being discussed at that point and are not intended to imply any limitation as to the scope of disclosure more generally. All methods described herein may perform in any suitable order unless otherwise indicated herein or clearly contradicted by context.

Accordingly, this disclosure includes all modifications and equivalences of the subject-matter recited in the claims appended hereto as permitted by applicable law. Moreover, any combination of the above-described elements in all possible variations thereof is encompassed by the disclosure unless otherwise indicated herein or clearly contradicted by context.

Although the preferred embodiments of this disclosure have been described herein, improvements and modifications may be incorporated without departing from the scope of the following claims.

The invention claimed is:

1. A sensing device for a digital linear position sensor, comprising:
a mounting device including a mounting surface;
a plurality of resistors mounted on the mounting surface, the plurality of resistors being electrically connected between a first voltage node (Uin) and a second voltage node (GND); and
a plurality of Hall switches mounted on the mounting surface at predetermined intervals in a longitudinal direction of the mounting device, each of the plurality of Hall switches being configured to adjust a total resistance of the plurality of resistors between the first voltage node (Uin) and the second voltage node (GND) upon actuation by an applied magnetic field.

2. The sensing device of claim 1, wherein the plurality of resistors are electrically connected in series between the first voltage node (Uin) and the second voltage node (GND), and each of the plurality of Hall switches is electrically connected to a different node formed between two adjacent ones of the plurality of resistors.

3. The sensing device of claim 1, further comprising a signal conditioning unit configured to determine a voltage drop (Uo) across the plurality of resistors in order to determine which of the plurality of Hall switches has been actuated by the applied magnetic field.

4. The sensing device of claim 3, wherein the signal conditioning unit is mounted on the mounting device.

5. The sensing device of claim 1, wherein the mounting device is configured as a surface-mount device, and the plurality of resistors and the plurality of Hall switches are mounted on the mounting surface using a surface-mount technique.

6. The sensing device of claim 1, wherein the mounting device includes a mounting unit having a first connecting portion and a matching second connecting portion formed at opposite ends of the mounting unit, the mounting unit being configured to be electrically connected to at least one other mounting unit having at least one of the first connecting portion and the second connecting portion.

7. The sensing device of claim 6, wherein the sensing device is formed by a plurality of mounting units electrically connected to each other.

8. The sensing device of claim 1, wherein the plurality of Hall switches includes a first row of Hall switches and a second row of Hall switches, the first row of Hall switches being offset with respect to the second row of Hall switches in the longitudinal direction of the mounting device.

9. The sensing device of claim 1, wherein a length of the mounting device in the longitudinal direction is greater than about 100 mm.

10. The sensing device of claim 1, wherein the predetermined intervals are less than 5 mm.

11. A digital linear position sensor for a hydraulic cylinder, comprising:
a rod configured to be fixedly mounted to the hydraulic cylinder, the rod having an internal space formed therein; and
a sensing device disposed in the internal space and attached to the rod, the sensing device including:
a mounting device including a mounting surface;
a plurality of resistors mounted on the mounting surface, the plurality of resistors being electrically connected between a first voltage node (Uin) and a second voltage node (GND); and
a plurality of Hall switches mounted on the mounting surface at predetermined intervals in a longitudinal direction of the mounting device, each of the plurality of Hall switches being configured to adjust a total resistance of the plurality of resistors between the first voltage node (Uin) and the second voltage node (GND) upon actuation by an applied magnetic field.

12. The digital linear position sensor according to claim 11, further comprising a hollow cylindrical magnet device configured to be mounted on a piston of the hydraulic cylinder such that it is disposed around the rod and movable along the same with movement of the piston in the hydraulic cylinder.

13. The digital linear position sensor according to claim 12, wherein the hollow cylindrical magnet device includes a shell and a magnet disposed within the shell, the magnet including at least one of:
a pair of chip magnets;
an isotropic ring magnet;
a pair of axially counterpole mounted ring magnets; and
an axial ring magnet having a magnetic shield device provided on one side of the same in an axial direction.

14. The digital linear position sensor according to claim 11, wherein the mounting device is disposed in the internal space at an off-center position with respect to a central axis of the rod.

15. The digital linear position sensor according to claim 11, wherein a plurality of sensing devices are disposed in the internal space, preferably being offset with respect to each other in the longitudinal direction by an amount that is smaller than the predetermined intervals between the Hall switches.

16. The digital linear position sensor of claim 11, wherein the plurality of resistors are electrically connected in series between the first voltage node (Uin) and the second voltage node (GND), and each of the plurality of Hall switches is electrically connected to a different node formed between two adjacent ones of the plurality of resistors.

17. The digital linear position sensor of claim 11, further comprising a signal conditioning unit configured to determine a voltage drop (Uo) across the plurality of resistors in order to determine which of the plurality of Hall switches has been actuated by the applied magnetic field.

18. The digital linear position sensor of claim 17, wherein the signal conditioning unit is mounted on the mounting device.

19. The digital linear position sensor of claim 11, wherein the mounting device is configured as a surface-mount device, and the plurality of resistors and the plurality of Hall switches are mounted on the mounting surface using a surface-mount technique.

20. The digital linear position sensor of claim 11, wherein the mounting device includes a mounting unit having a first connecting portion and a matching second connecting portion formed at opposite ends of the mounting unit, the mounting unit being configured to be electrically connected to at least one other mounting unit having at least one of the first connecting portion and the second connecting portion.

* * * * *